United States Patent
Pope

(10) Patent No.: US 9,832,578 B2
(45) Date of Patent: Nov. 28, 2017

(54) ENABLING CONCURRENT PROPRIETARY AUDIO AND BLUETOOTH LOW ENERGY USING ENHANCED LE LINK LAYER FOR HEARING DEVICE

(71) Applicant: IntriCon Corporation, Arden Hills, MN (US)

(72) Inventor: Zachary R. Pope, Hopkins, MN (US)

(73) Assignee: IntriCon Corporation, Arden Hills, MN (US)

(*) Notice: Subject to any disclaimer, the term of this patent is extended or adjusted under 35 U.S.C. 154(b) by 151 days.

(21) Appl. No.: 15/050,181

(22) Filed: Feb. 22, 2016

(65) Prior Publication Data

US 2016/0249356 A1 Aug. 25, 2016

Related U.S. Application Data

(60) Provisional application No. 62/119,564, filed on Feb. 23, 2015.

(51) Int. Cl.
| | |
|---|---|
| *H04R 25/00* | (2006.01) |
| *H04W 4/00* | (2009.01) |
| *H04L 29/06* | (2006.01) |
| *H04W 52/02* | (2009.01) |
| *H04W 72/12* | (2009.01) |
| *H04W 74/00* | (2009.01) |
| *H04W 84/18* | (2009.01) |

(52) U.S. Cl.
CPC .......... *H04R 25/558* (2013.01); *H04L 65/60* (2013.01); *H04W 4/008* (2013.01); *H04W 52/0216* (2013.01); *H04R 25/554* (2013.01); *H04R 25/70* (2013.01); *H04R 2225/55* (2013.01); *H04W 72/1284* (2013.01); *H04W 74/00* (2013.01); *H04W 84/18* (2013.01); *Y02B 60/50* (2013.01)

(58) Field of Classification Search
CPC ...... H04R 25/00; H04R 25/55; H04R 25/554; H04R 25/558; H04R 2225/55
See application file for complete search history.

(56) References Cited

U.S. PATENT DOCUMENTS

| | | |
|---|---|---|
| 7,519,193 B2 | 4/2009 | Fretz |
| 8,355,517 B1 | 1/2013 | Fretz |
| 8,358,797 B2 | 1/2013 | Fretz |
| 8,767,987 B2 | 7/2014 | Fretz |
| 8,849,202 B2 | 9/2014 | Linde et al. |

(Continued)

*Primary Examiner* — Feben M Haile
(74) *Attorney, Agent, or Firm* — Shewchuk IP Services, LLC; Jeffrey D. Shewchuk

(57) ABSTRACT

A battery-powered mobile device allows concurrent wireless transception of control data via standard Bluetooth low energy (BLE) and proprietary audio streaming, using the same physical layer of the radio. Following each BLE connection event, an enhanced link layer clocks a remaining duration of the current idle time period. Requests provided to the enhanced link layer include time slot information for the proprietary audio bursts. The enhanced link layer determines, based on the time slot information, whether each requested burst can be completed during the remaining duration of the current idle time period, appropriately linking payload information of each packet with the BLE control data stack or with a proprietary audio stack, with the BLE control data having priority over the proprietary audio requests.

19 Claims, 4 Drawing Sheets

(56) References Cited

U.S. PATENT DOCUMENTS

| | | |
|---|---|---|
| 2011/0021142 A1* | 1/2011 | Desai .................. H04W 8/005 455/41.2 |
| 2013/0102251 A1 | 4/2013 | Linde et al. |
| 2014/0348327 A1 | 11/2014 | Linde et al. |
| 2015/0010179 A1 | 1/2015 | Solum |
| 2015/0201446 A1 | 7/2015 | Linsky et al. |
| 2015/0312858 A1 | 10/2015 | Kerai |
| 2015/0334488 A1 | 11/2015 | Kim et al. |
| 2015/0341724 A1 | 11/2015 | Pedersen et al. |
| 2015/0365208 A1 | 12/2015 | Hyun et al. |
| 2015/0365999 A1 | 12/2015 | Lee et al. |

* cited by examiner

ENABLING CONCURRENT PROPRIETARY AUDIO AND BLUETOOTH LOW ENERGY USING ENHANCED LE LINK LAYER FOR HEARING DEVICE

CROSS-REFERENCE TO RELATED APPLICATION(S)

The present application claims the benefit of U.S. provisional patent application Ser. No. 62/119,564, filed Feb. 23, 2015. The contents of U.S. provisional patent application Ser. No. 62/119,564 are hereby incorporated by reference in entirety.

BACKGROUND OF THE INVENTION

The present invention relates to body-worn mobile hearing devices, such as head-worn hearing aids and personal sound amplifier products ("PSAPs") which are powered by one or more batteries. In particular, the present invention pertains to such hearing devices which have the capacity to wirelessly stream real-time audio content.

Today's hearing devices are increasingly technologically advanced to improve the overall experience of the user. Such hearing devices are commonly powered by a rechargeable or replaceable battery, powering a digital signal processor and a small speaker (referred to in the hearing aid industry as a "receiver") with a sound outlet typically located in the ear canal, and commonly also including a microphone to receive airbourne audio pressure waves. Changing the battery in such devices can range from being a nuisance to being extremely difficult, depending upon the manual dexterity of the user (who is frequently elderly). Frequent battery changes also increases operating expense. Accordingly, such hearing devices should be designed to use as little electrical power as possible and thereby conserve battery life for as long as possible. Such hearing devices are frequently also quite small, thereby making the device more inconspicuous and oftentimes more comfortable for head-worn or ear-carried wearing.

One common technological advancement which is desired to be included in such mobile hearing devices is an integrated wireless system. In one aspect, an on-board integrated wireless system can enable commands and programming data to be wirelessly communicated to the hearing device, such as for changing various settings or programs of the digital signal processor. The recent standardization of a Bluetooth Low Energy ("BLE") protocol has created new opportunities for sending various types of data to a hearing device while conserving battery power. BLE is designed, standardized and marketed by the Bluetooth Special Interest Group ("SIG"), and is intended to provide considerably reduced power consumption and cost while maintaining a similar communication range (generally less than 100 m) as classic Bluetooth. BLE operates in the same spectrum range (approximately 2.4 GHz) as classic Bluetooth technology, but generally has 40 2-MHz channels instead of 79 1-MHz channels. Within a channel, data is transmitted using Gaussian frequency shift keying modulation, using an adaptive frequency hopping scheme to counteract narrowband interference problems. Each BLE packet must be from 80 to 376 bits in length.

Typical BLE applications are provided with a BLE protocol stack that can be split between defined host and controller roles. The host of the BLE protocol stack (typically running on an application processor) generally includes the Generic Access Profile (GAP), the Generic Attribute Profile (GATT), the Attribute Protocol (ATT), the Security Manager (SM) and the Logical Link Control and Adaption Protocol (L2CAP). The controller of the BLE protocol stack (typically implemented as a small System-on-Chip (SOC) with an integrated radio) includes a Link Layer (LL) and a Physical Layer (PHY). The PHY in BLE operates at a data rate of 1 Mbps. Communication between the Host and the Controller is standardized via the Host Controller Interface (HCI). The Link Layer in the BLE stack of the hearing device is responsible for managing the physical transceiver radio components (PHY), i.e, for managing all of the timing and synchronization, frequency hopping algorithms, state machines, send and receive Channel Protocol Data Units (Advertising and Data channels), assembly and transfer of packets to and from the PHY and L2CAP and numerous other functions. The activity between the Link Layer and corresponding channel activity on the PHY are quite advanced, and depend on the current state and connection parameters—all of which the Link Layer knows about and manages by being told these settings from L2CAP instructions. All connection activity, whether it is an advertisement or a connection event, happens in synchronous time intervals, that is, repeatable time frames. This is a key aspect of BLE and is what allows the battery life saving that has made BLE so popular. If we look within a connection event—again either for advertising packets or connection data packets—there can be a number of exchanges within the event. The event always starts by a master sending a packet to the slave, starting at time 0, called the anchor point. The slave, in this case the mobile hearing device, can and will respond as needed for that connection event. The connection event can be ended by either the slave or the master, and when it does end, the PHY turns off until the next anchor point. The key to BLE's power savings is the duty cycle, or time comparison between the length of the connection event and the connection interval. In some real world applications, such as sending settings of the digital signal processor of a hearing aid or PSAP, the connection event is often a 300 µS maximum activity duration within a 500 mS connection interval, which corresponds to 0.06% duty cycle.

Several of the constraints of BLE are important toward determining theoretical and realistic maximum data throughput rate. In particular, the time between two consecutive connection events between a master and slave is defined in the BLE 4.0 specification to be between 7.5 ms and 4.0 s in 1.25 ms increments. In two popular market implementations, Android operating system smartphones have a minimum time between two consecutive BLE connection events of 7.5 ms, whereas APPLE iOS smartphones have a minimum time between two consecutive BLE connection events of 18.5 ms. The maximum L2CAP payload size is defined in the BLE 4.0 specification to be 23 bytes. Above the L2CAP layer, the Attribute Protocol imposes a 3 byte header, leaving 20 bytes for maximum application data per packet. Including Inter Frame Space time for silicon cool down and for acknowledgements for each PDU as defined in BLE 4.0, this results in a maximum theoretic application data throughput rate of about 234 kbps. Discounted for real world conditions such as Bit Error Rates (BLE behavior limits unnecessary waste of energy while bit errors are being found in one data channel, but degrades the effective throughput of BLE in the presence of bit errors), the number of application layer messages a device can send per connection event (due to memory limitations), the actual number of notifications per connection event, as well as processing delays, the maximum BLE throughput that can be reliably achieved in a real scenario is about 34 kbps for unacknowledged data transmission and about 8.5 kbps for acknowledged data transmission.

Separately, the constraints of sampling, transmitting and receiving audio information are generally well know and well established. The design inputs and requirements for streaming audio for hearing aid applications, such as when viewing an audio-visual program including speech, include significant latency and audio quality limitations.

Streaming of audio for hearing aid applications, and in most other similar consumer electronics, has a challenging requirement for latency. Latency is defined as the time it takes to convert sound waves from the streaming device (source), transmit the digitized information wirelessly to the hearing aid (sink), and convert back into an understandable recreation of that original audio using the hearing aid receiver (speaker). Latency becomes increasingly important for applications that involve sound and visual synchronization. For example, when a user watches a TV, the user can see the content visually, and needs to receive the corresponding audio within a "reasonable amount of time", before the user experience is compromised by a noticeable audio delay. The hearing aid industry has researched this topic in great detail, and has concluded that the maximum latency before a user begins to notice the delay of audio from corresponding visual cues depends greatly on age but ranges from 5 to 40 ms. The Bluetooth SIG Hearing Aid Working Group (HAWG), which includes six leading hearing aid manufacturers, has agreed on a maximum wireless system delay of 20 ms for future Bluetooth standards. The wireless system delay can include delays associated with encoding the audio signal, packetizing the audio data, transmitting the audio data, receiving the audio data, reassembling the packets, and decoding the audio data. Additional delays can be incurred in the hearing device due to processing the audio data (in the digital signal processor fit for the particular user) and converting the audio data into sound. Because of the challenging latency requirements of audio streaming, the connection interval of audio packets must be less than 40 ms to achieve the latency requirement, or 20 ms to achieve the requirement of typical hearing aid applications. Further, it is likely that packets and events will—at times—fail to be received by the hearing device, and thus some redundancy is required in multiple packets and events to reduce the impact of lost packets. The 20 mS interval can be broken down into quarters to enable this redundancy, resulting in synchronous events separated by 5 ms. Longer event intervals such as 10 ms may be used (or anything in between), but longer event intervals make redundancy more difficult to achieve.

In the hearing aid industry and in general consumer electronics like Bluetooth headsets, audio quality has been heavily researched to determine the quality requirements for the applications and markets of interest. For hearing aids, there are two quality definitions considered; standard quality (SQ) and high quality (HQ). In typical audio and hearing aid applications, a 16 bit analog to digital converter at a sampling frequency of 16 kHz (24 kHz for HQ) can achieve streaming audio frequencies up to 8 kHz, an acceptable maximum frequency and acceptable fidelity for the human ear including for speech. Combining these two considerations, the minimum uncompressed digital audio data is 16 bit×16 khz (SQ)=256 kbps, or 16 bit×24 khz (HQ)=348 kbps.

The hearing industry has also researched audio compression algorithms to reduce the wireless throughput requirements, while still maintaining the ability to acceptably recreate the original audio signal. Industry standard codecs like G722 can achieve 4:1 compression ratios, though compression ratios up to 6:1 or even 8:1 may be achievable in the future. Combining the industry standard codec with and audio requirements, the required encoded data reliable transmission rate is 256 kbps/(4:1)=64 kbps (SQ), or 348 kbps/(4:1)=96 kbps (HQ). The above value of 64 kbps should be considered the minimum amount of data that the wireless system presently needs to transfer to the hearing device (sink) in a streaming mode to achieve "real-time streaming audio". Note that this value can and will increase for various other considerations, such as for including header information, and for stereo streaming mode and HQ streaming, but could decrease with better (future, i.e., unknown to Applicant at this time) codecs.

Given these latency and quality data transfer limitations, BLE is generally viewed as being inadequate to transfer audio information, particularly real-time streaming of audio information. Accordingly, most mobile hearing devices, if they support wireless audio streaming, transmit the audio information to the mobile hearing device via a proprietary protocol or link. If a mobile hearing device supports both BLE and proprietary transmissions, there is generally separate hardware for both, increasing the cost, complexity and circuit footprint of the device.

Examples which seek to merge BLE with audio streaming transmissions include U.S. Pat. No. 8,849,202, U.S. Pat. Pub. Nos. 2013/0102251, 2014/0348327, 2015/0010179, 2015/0201446 and 2015/0334488, and WIPO Pat. Pub. No. WO2014/076527, each incorporated by reference, but none of such examples consider the present invention. While these examples have various benefits and (particularly feasibility) detriments, better solutions are needed.

BRIEF SUMMARY OF THE INVENTION

The present invention is a method and structure for concurrent use of a radio transceiver in a battery-powered mobile device for both control data and audio streaming. The control data is received using a standard Bluetooth low energy protocol, which involves idle time periods between connection events. Following each connection event, an enhanced link layer clocks a remaining duration of the current idle time period. The enhanced link layer also receives requests for real time audio streaming transmissions using a proprietary protocol, which requests including time slot information for the proprietary audio bursts. The enhanced link layer determines, based on the time slot information, whether each requested burst can be completed during the remaining duration of the current idle time period. If the requested burst cannot be completed during the remaining duration of the current idle time period, the enhanced link layer maintains communication between the control data stack and the physical layer of the Bluetooth low energy radio. If the requested burst can be completed during the remaining duration of the current idle time period, the link layer provides communication between the proprietary audio stack and the physical layer of the Bluetooth low energy radio.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
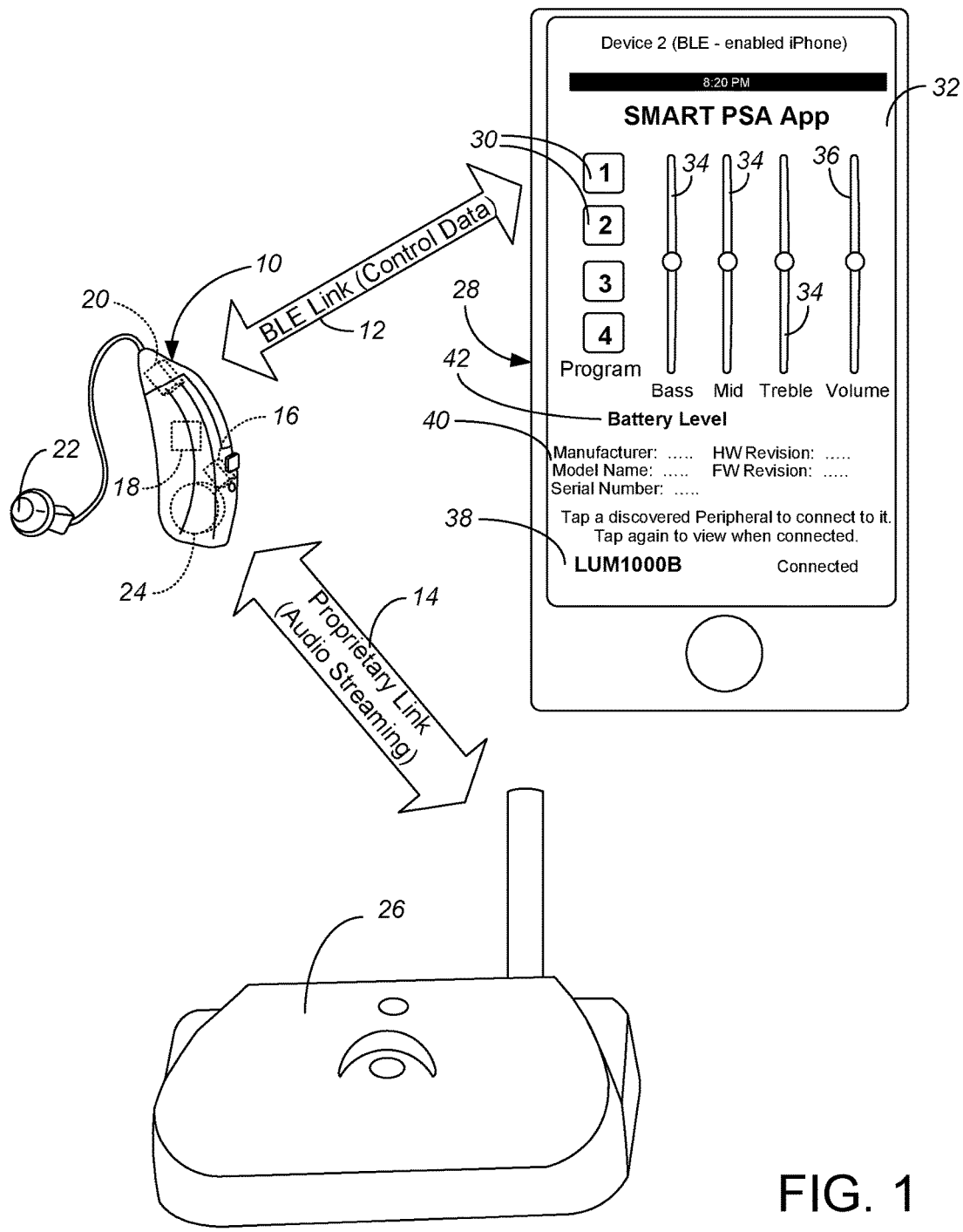
FIG. 1 depicts the devices of a first use case scenario incorporating the present invention, including showing an example control touch screen of a smartphone.

The present invention uses a single 2.4 Ghz radio subsystem in a mobile, battery-powered hearing device 10 to enable a BLE link 12 to transceive control information concurrently with real time audio streaming transmissions over a proprietary audio link 14. The invention enables a much improved user experience, such as depicted in either FIG. 1 or FIG. 2. In the system of FIG. 1, the battery powered mobile device 10 is a hearing aid or PSAP, designed for head-worn or ear-carried usage. The hearing device 10 includes a microphone 16, a standard digital signal processor 18 and a speaker (receiver) 20 with a sound outlet 22 directed into the user's ear canal (not shown), powered by a replaceable or rechargeable battery 24, such as the hearing aids further disclosed in U.S. Pat. Nos. 7,519,193, 8,355, 517, 8,358,797 and 8,767,987, all assigned to the assignee of the present invention and each incorporated by reference. The user enjoys receiving a streaming real-time audio link 14 from a proprietary television streamer 26. In this context, the term "proprietary" is used to mean a transmission scheme, not classic Bluetooth or BLE, which meets the constraints discussed above for real time audio transmissions. For latency requirements, such transmissions must be segmented in bursts with some spacing of bursts, with each burst having a duration no greater than 10 ms, so the entire latency of the audio is no greater than 40 ms. For quality requirements, the bursts must collectively provide an audio data transmission rate of at least 34 kbps. For content requirements, the data in the bursts must define the audio signal that is output by the hearing device 10 (possibly as modified by the digital signal processor 18 or other electrical filters/components) as acoustic pressure waves to be heard by the user. The term "proprietary" as used herein does not necessarily mean that a single company has exclusive rights to the transmission scheme, although all transmission schemes currently known to applicant which meet these latency, quality and content requirements in the 2.4 GHz range appear to be transmission schemes designed by a single company without openly licensing or widely publishing a definition of the transmission scheme rules. Instead, such proprietary TV streamers are made commercially available by the supplier of the particular hearing device. The preferred television streamer 26 transmits audio data 14 at up to 2 Mbps, using retransmissions and acknowledgements, and using its own frequency hopping algorithm different from the BLE frequency hopping algorithm. Alternatively, the television streamer could use a slower audio data rate (but at least 34 kbps for audio data+additional header/envelope kbps), or alternatively could piggyback on the BLE frequency hopping algorithm.

Concurrently while listening to the real time audio 14, the user connects to his/her smartphone 28 for transceiving hearing device control data over a standard BLE protocol link 12, such as settings for volume, program, and even changing in real time parameters such as band specific gain for an equalizer effect, all customizable by the user for the specific audio program being streamed and heard. In this preferred embodiment, the software application ("app") running on the smartphone 28 includes four program options, with buttons 30 on the smartphone touch screen 32 labeled "1" (normal), "2" (music), "3" (stream only) and "4" (disabled). The touch screen 32 of the preferred app includes slider equalizer-type controls 34 for "Base" frequencies, "Mid" range frequencies, and "Treble" frequencies, as well as a slider control 36 for Volume (when running programs "1" or "2", the touch screen 32 may alternatively allow separate volume and equalizer controls for both the hearing device microphone 16 and the streamed audio 14 rather than having the hearing device microphone 16 and the streamed audio 14 be merged and jointly controlled.) The touch screen 32 on the preferred app also includes at the bottom a section 38 allowing BLE connection and disconnection control, in this case displaying that the smartphone 28 is BLE connected to the LUM1000B hearing aid 10. The touch screen 32 on the preferred app also displays other details 40 read from the hearing device 10, including the battery level 42 of the battery 24 in the hearing device 10.

As one example, audio-visual movies often include both relatively low volume dialogue and relatively high-volume sound effects (such as explosions) which may occur at different characteristic frequencies. As another example, other audio-visual programs often include both relatively high-pitched musical tones and singing, with relatively low-pitch sounds (such as percussion). In either of these situations, the user can utilize the present invention—while listening and watching the audio-visual program or movie—to adjust the various sounds and speech for that particular user's hearing particular to that particular audio-visual program/movie. As a third example, television often has commercials that are broadcast at higher volume than programming. In that situation, the user can keep his or her smartphone 28 handy, and quickly turn the volume down on the head-worn hearing device 10 using the smartphone 28 whenever a commercial airs, turning the volume up when the desired audio-visual programming resumes.

A key advantage of the present invention is, without significantly increasing hardware costs, the user has the ability to change the hearing aid parameters in real time while listening to the audio stream 14 to hear the effect of the changes. Many smartphones currently on the market or soon to be on the market already have standard BLE protocol transception capabilities, so the only modification to the smartphone 28 is to download and install application software specific to the hearing aid parameters being controlled. The hearing aid 10 and the proprietary TV streamer 26 are considered as part of the cost for real time audio transmissions of television programming regardless of the hearing aid control method, i.e., not attributable to the present invention. With other prior art or existing technology, the user would have to intervene to interrupt or end the audio stream 14, and only then connect to the BLE smartphone 28 to modify the hearing aid parameters.

Figure 2:
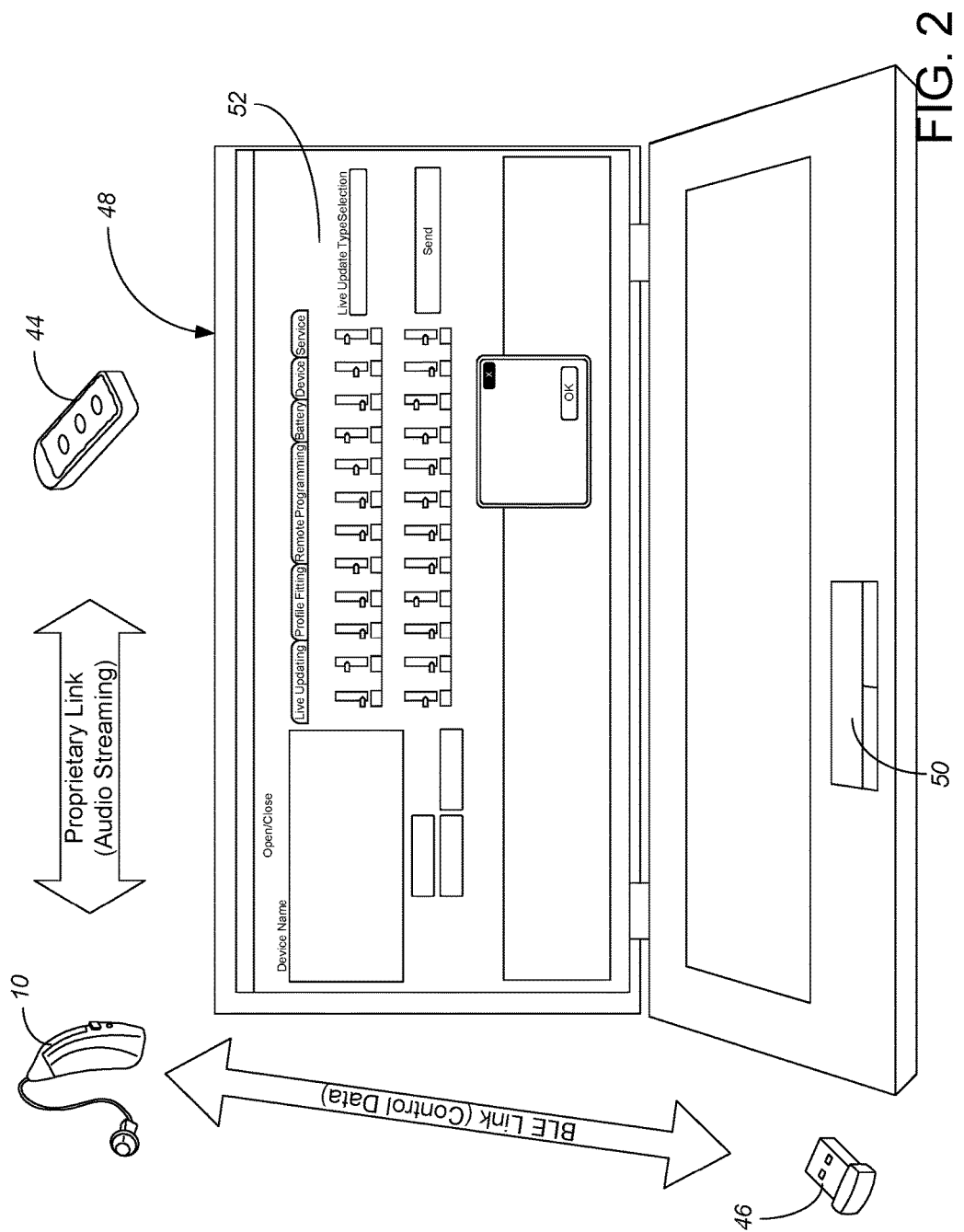
FIG. 2 depicts the devices of a second use case scenario incorporating the present invention, including showing an example control screen of a fitting computer.

FIG. 2 shows an alternative use-case example where the hearing aid 10 is receiving real-time audio 14 from a companion microphone 44. A BLE dongle 46 is added to a computer (or tablet) 48 to enable the computer 48 to transceive information via a standard BLE protocol. Though the BLE dongle 46 is usually separately purchased by the user for this use-case, standard BLE protocol dongles are commercially available at relatively low cost, with various BLE dongles being currently advertised for sale in the range of $5-$15. The computer 48 is running a software application which allows for adjustments for programming and fitting of the hearing aid 10. The user could, for instance, use the companion microphone 44 in an in-home setting listening to a friend or family member while simultaneously controlling (via the computer mousepad 50) the fitting and programming adjustments 52 of the hearing aid 10 to optimize the hearing aid parameters for that particular person speaking. The preferred fitting and programming adjustment software application 52 running on the computer and shown in FIG. 2 is quite sophisticated and preferably utilizes the computer screen's larger size to display and control even more settings of the digital signal processor 18 in the hearing device 10 than can be controlled using the smartphone 28 in FIG. 1.

A third use-case example could combine these two, such that a user could employ a lavalier or companion microphone in a public setting such as a restaurant. While streaming audio therefrom, the user also controls volume or other settings on a hearing aid or PSAP via a hand-held smartphone transmitting commands via a standard BLE connection, so the user can customize the hearing aid or PSAP for the specific restaurant audio conditions. Another alternative involves combining any of these three use-case examples if used in an environment where more than one proprietary audio stream is present and available. For example TV streamer 26 and the remote microphone 44 could be used in the same room. The hearing device 10 can BLE transmit 12 information so the smartphone 28 or computer 48 displays a list of available audio streams in the area. The user can navigate the available proprietary audio streams and select the desired stream for listening, and BLE transmit 12 to the hearing device 10 instructions on which audio stream to link to. In all these situations, the key advantage is enabling the user to control the hearing aid/PSAP parameters in real time while listening to the audio stream to hear the effect of the changes, all at a minimal incremental cost.

Figure 3:
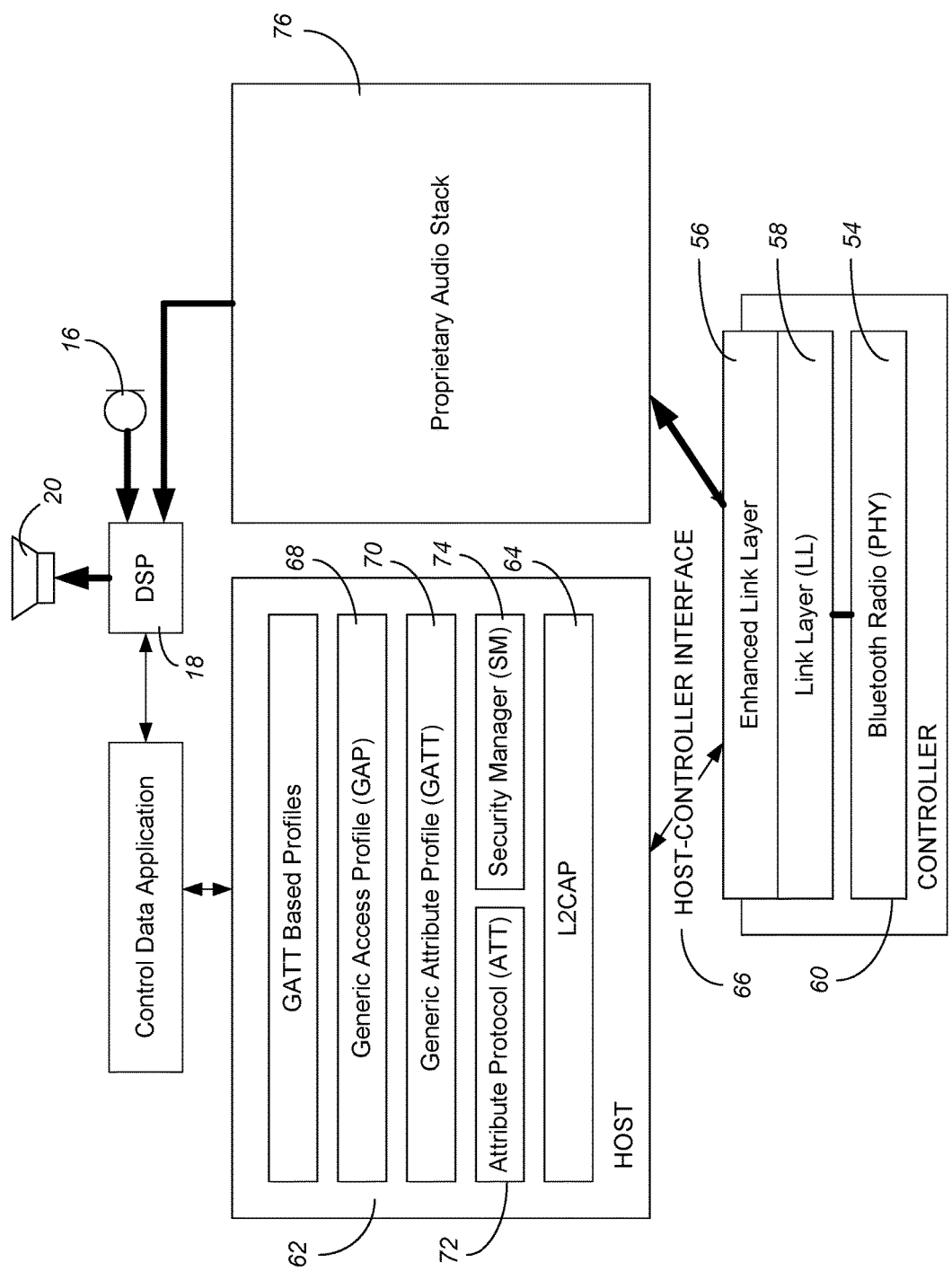
FIG. 3 is a schematic showing where the enhanced link layer of the present invention is incorporated into the BLE stack.

To achieve the BLE connectivity 12 while concurrently streaming real time audio 14 using the same PHY 54, the current invention utilizes an enhanced link layer 56 as depicted in FIG. 3. In the preferred embodiment, the enhanced link layer 56 is a set of functions which is directly written into the link layer code 58 present in prior art BLE stacks. Thus, in the preferred embodiment, the radio transceiver 54 and Bluetooth low energy link layer 56/58 are parts of a fully integrated 2.4 GHz system-on-chip radio, with the enhanced link layer 56 programmed into the system-on-chip. Alternatively, the enhanced link layer 56 can be coded as a separate layer located on top of the prior art BLE link layer 58, either as part of the controller 60 or outside both the controller 60 and the host 62. As a final (but undesired) alternative, the enhanced link layer 56 could be coded into the host 62 adjacent the L2CAP 64, but generally such a placement would unnecessarily burden the host-controller interface 66.

As shown in FIG. 3, the host 62 portion of the BLE stack is substantially the same as known BLE stacks, including the Generic Access Profile (GAP) 68, the Generic Attribute Profile (GATT) 70, the Attribute Protocol (ATT) 72, the Security Manager (SM) 74 and the Logical Link Control and Adaption Protocol (L2CAP) 64. Side by side with this host 62 portion of the BLE stack as implemented in the hearing device 10 is a proprietary audio streaming stack 76. In contrast to the host BLE stack 62 which carries substantial data in both directions, the proprietary audio streaming stack 76 is intended to carry data in substantially only one incoming direction (except for acknowledgement and timing information being transmitted in the outgoing direction), where the audio stream 14 is received in the hearing device 10 in bursts from the proprietary audio source device such as the TV streamer 26 or the companion microphone 44. The proprietary audio bursts must have a duration shorter than the regular anchor timing, so as to be receivable between the BLE transmissions at the regular anchor timing. For use with iOS smartphones, which limit the regular anchor timing of BLE transmissions to 18.5 ms or greater, the 10 ms latency requirement ensures that the proprietary audio bursts must have a duration shorter than the regular anchor timing. For use with ANDROID smartphones, which allow the full BLE possibilities of regular anchor timing down to 7.5 ms, this means that the present invention requires the proprietary bursts to be less than 7.5 ms.

Figure 4:
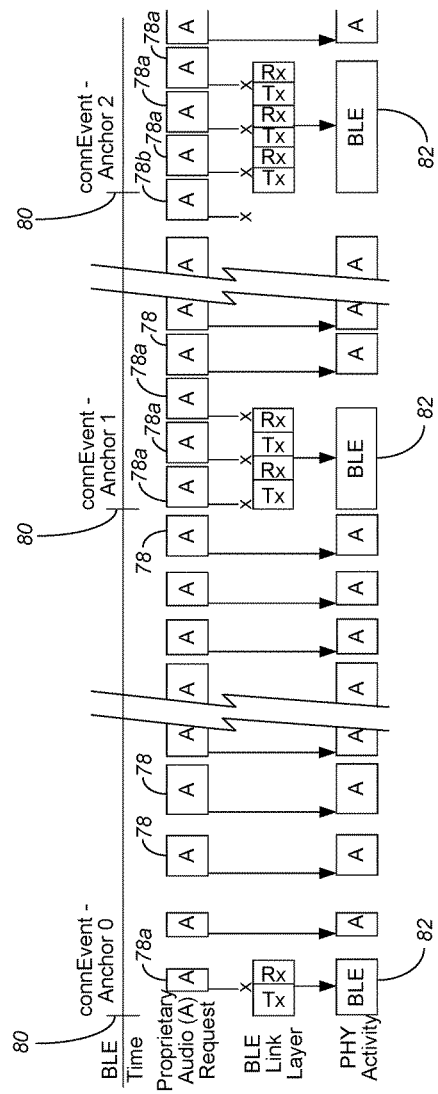
FIG. 4 is a schematic representation of the preferencing of the present invention between the BLE packets and the proprietary audio transmissions.

In the present invention, the enhanced link layer 56 is programmed so BLE activity takes priority over the proprietary audio stack activity. An important aspect of the present invention best explained with reference to FIG. 4 is that the enhanced link layer 56 utilizes information about the length of audio packets 78, in a comparison with inquiries on whether there is current activity on the PHY 54 and when the next anchor point 80 for a scheduled BLE event 82 will occur. As known in existing link layers 58, the standard BLE protocol establishes regular anchor points 80. On every BLE connection event (advertising or connection PDU) 82, the link layer 56/58 sends BLE activity to the PHY 54 beginning at time of Anchor X. The event 82 lasts for a certain period of time, depending on how many PDU exchanges there are. Either the master or slave can terminate any given BLE connection event 82 depending on whether there is more data to send among other things. Thus the duration of the BLE connection event 82 is not fixed, but the duration of BLE connection interval is always known and maintained in the link layer 56/58, pending instruction from the L2CAP 64 to change the BLE connection interval. While the duration of the BLE connection event 82 can vary (in the full BLE protocol, to any value within the vast range of 7.5 ms to 4 s), the Link Layer 56/58 also knows when the next BLE anchor point 80 is. In the preferred embodiment, a RADIO_IDLE duration from the end of a connection event 82 until the next anchor point 80 is determined and clocked in the enhanced link layer 56 after each BLE connection event 82.

While the BLE protocol would enable BLE connection events 82 spaced up to 4 s apart, in the preferred embodiment the software application running on the smartphone 28 or computer restricts the maximum time between connection events 82, whenever the user is actively controlling the touchscreen 32 or mousepad 50, based on user perceptions of changing the hearing device parameters under consideration. For example, most users feel that control over volume is too slow if the volume adjustment takes more than about 1 second to hear, in which case the BLE connection event anchor timing should be limited to the range of 7.5 ms to 1 s. In more preferred embodiments, during dragging of a finger on the smartphone control 34, 36 or mouse manipulation of a slider bar on the computer 48, the software application provides BLE connection event anchor timing within a range of 100 ms to 250 ms. Advertising intervals of the BLE link 12 are preferably slower than the BLE connection event anchor timing, such as advertising intervals of 500 ms or greater. In the example shown in FIG. 4, the BLE connection event anchor timing is intended to represent a most preferred embodiment of about 100 ms anchor timing, while the proprietary audio bursts 78 are intended to be a maximum of 5 ms in duration. Moreover, the BLE communication 12 is only used to transceive control data for the hearing device 10. Depending upon the software application running on the smartphone 28 or computer 48 (see FIGS. 1 and 2), the control data might include settings for volume, program, and band specific gain. Consistent with the standard BLE protocol, the control data is limited to a maximum of 20 bytes per packet. In the preferred embodiment, an update to any of volume, program, and band specific gain is only 13 bytes. An alternative implementation may allow BLE transmission 12 of all DSP parameters of interest in a single packet, compressed via a codec within 20 bytes. Regardless, the control data rate for the hearing device 10 is always far less than the 34 kbps required of standard quality real time audio streaming 14. In the preferred embodiments, the control data over the BLE link 12 is much less data intensive than the audio data being transmitted over the proprietary link 14, even when the user is maximizing the smartphone/computer control and changing the control data as quickly as possible. In the most preferred embodiments using no more than 13 bytes per update and a maximum of 10 updates per second, the BLE link 12 is used at a maximum of 1.04 kbps. Simultaneously, the preferred proprietary audio link 14 uses G722 Mode 1 audio requiring at least 64 kbps. Thus, in preferred embodiments of the present invention, the average transmission rate of BLE data will be less than 2% of the proprietary audio transmission rate (when audio data is being transmitted, i.e., substantially all times other than silence), so the ratio of real time audio stream rate to control data transception rate is at least 50 to 1. Within the hearing device 10, the different intensity data rates are reflected in FIG. 3 with differing line thicknesses and arrow heads for the audio data than the control data.

The enhanced link layer 56 has a request function which is sent from the external Proprietary Protocol stack 76 each time a radio activity 78 is desired. The enhanced link layer 56 uses its knowledge of RADIO_IDLE and the next anchor point 80 to determine whether the proprietary request has enough time to execute. The BLE link 12 always has priority, thus the proprietary audio activity 78 will be passed to/from the PHY 54 ONLY if there is enough time to do so.

When transceiving streaming audio data, the proprietary audio stack 76 sends a request to the enhanced link layer 56 to have control of the radio 54 for its own proprietary audio activity 14. This request contains timing envelope information, also referred to as time slot information. The enhance link layer 56 decides whether there is enough time to process the activity. In typical usage as explained above, BLE anchor points 80 might occur every 100 mS, while audio events 78 might occur every 5 mS. With most BLE activity being of short duration (i.e., a low duty cycle), there will rarely be a collision between BLE and proprietary audio activity. But when such a collision occurs, the enhanced link layer 56 will choose the BLE activity. Thus an important aspect of the present invention is that the enhanced link layer 56 provides an enhanced signaling method that allows inquiries on whether there is current activity on the PHY 54 and, if not, inquiries on the duration until the next scheduled BLE event 82.

When the proprietary audio request comes into the enhanced link layer 56, the proprietary audio request includes a number of parameters, including the duration of the requested proprietary audio event. This time slot is representative of the envelope for all activity for the audio event, including both transmission and reception, even though the audio streaming data payload will be only received. Based on the requested time slot duration, the enhanced link layer 56 readily determines whether the remaining RADIO_IDLE time is sufficient for the proprietary audio event, rejecting any event if insufficient time. As shown in FIG. 4, audio packets 78*a* were rejected because the request was sent during a BLE event 82, and audio packet 78*b* was rejected because the request envelope indicated that the duration of audio packet 78*b* was greater than the remaining RADIO_IDLE duration until the next anchor point 80. If sufficient time remains, the enhanced link layer 56 passes a semaphore to the proprietary audio stack 76 which signals to the system that the proprietary audio stack 76 has access to that radio resource 54. In other words, if the requested burst 78 cannot be completed during the remaining duration of the current RADIO_IDLE time period, the link layer 56/58 maintains communication between the BLE stack 62 used for control data and the physical layer 54 of the Bluetooth low energy radio. If the requested burst 78 can be completed during the remaining duration of the current RADIO_IDLE time period, the link layer 56/58 provides communication between the proprietary audio stack 76 and the physical layer 54 of the Bluetooth low energy radio.

Thus the present invention provides a method of concurrent use of a radio transceiver for both BLE control data 12 for a hearing device 10 and real time audio streaming 14. The enhanced link layer 56 is entirely a coded construct, so in preferred embodiments there is no additional cost to the hearing device 10 beyond the existing cost for the BLE host 62 and controller 60 and the existing cost for the proprietary audio streaming stack 76. The user greatly enjoys the ability to simultaneously adjust the hearing device 10 while listening to the audio stream 14 to hear the effect of the adjustment. It is recognized that the proprietary audio stream 14 will typically operate the PHY 54 at a significantly higher duty cycle (i.e., at least 50 times more) than its BLE usage (with a concomitant reduction in battery life), but the reduction in battery life is already present due to the intensity of proprietary audio streaming 14, not due to the concurrent use of both BLE 12 and proprietary audio streaming 14. Moreover, the full power savings of BLE will be achieved whenever proprietary audio streaming 14 is not being actively engaged, such as for standard hearing aid use where the audio signal comes solely from the microphone 16 in the hearing aid 10.

Although the present invention has been described with reference to preferred embodiments, workers skilled in the art will recognize that changes may be made in form and detail without departing from the spirit and scope of the invention.

What is claimed is:

1. A method of concurrent use of a radio transceiver for both control data and audio streaming, comprising:
controlling a physical layer of a radio transceiver in a battery-powered mobile device using a Bluetooth low energy link layer, wherein the link layer:
establishes regular anchor timing for transception of control data through connection events, with idle time periods between connection events, all in accordance with Bluetooth low energy protocol;
for each connection event, clocks a remaining duration of the current idle time period;

receives requests for real time audio streaming transmissions in bursts, such bursts having a duration shorter than the regular anchor timing and no greater than 10 ms, the bursts collectively providing real time audio streaming of at least 34 kbps, the requests including time slot information;

determines, based on the time slot information, whether each requested burst can be completed during the remaining duration of the current idle time period, wherein:

if the requested burst cannot be completed during the remaining duration of the current idle time period, the link layer maintains communication between a control data stack and the physical layer of the Bluetooth low energy radio; and if the requested burst can be completed during the remaining duration of the current idle time period, the link layer provides communication between an audio stack and the physical layer of the Bluetooth low energy radio.

2. The method of claim 1, wherein the control data is transceived from a first BLE-enabled computing device, and wherein the real time audio streaming transmissions are from a second device.

3. The method of claim 2, wherein the battery powered mobile device is a head-worn hearing device.

4. The method of claim 3, wherein head-worn hearing device is a hearing aid, and wherein the control data is programming data for fitting the hearing aid.

5. The method of claim 3, wherein the control data comprises volume and band-specific gain.

6. The method of claim 3, wherein transception rate of the control data is less than 34 kbps.

7. The method of claim 6, wherein a ratio of real time audio stream rate to control data transception rate is at least 50 to 1.

8. The method of claim 2, wherein the second device streams audio from an audio-visual program with no greater than 40 ms latency.

9. The method of claim 8, wherein the bursts have a duration no greater than 5 ms.

10. The method of claim 1, wherein the regular anchor timing is at intervals within a range of 7.5 ms to 4 s.

11. The method of claim 10, wherein each connection event is no longer than 2 ms, and wherein, while there is activity in the control data, the intervals for regular anchor timing are within the range of 100 to 250 ms.

12. The method of claim 10, wherein each connection event is no longer than 2 ms, and wherein the control data is transmitted/received from an iOS smartphone with intervals for regular anchor timing of at least 18.5 ms.

13. The method of claim 10, wherein the control data has a maximum of 20 bytes per packet.

14. The method of claim 1, wherein the radio transceiver and Bluetooth low energy link layer are parts of a fully integrated 2.4 GHz system on chip radio.

15. The method of claim 1, wherein the link layer determines completion of each connection event, and clocks the remaining duration of each idle time period by, following completion of each connection event, calculating time remaining before a next anchor.

16. A battery-powered mobile hearing device which allows concurrent use of a radio transceiver for both Bluetooth low energy control data and audio streaming, comprising:

a physical layer of a radio transceiver;
a link layer controlling the physical layer, wherein the link layer:

establishes regular anchor timing for transception of control data through connection events, with idle time periods between connection events, all in accordance with Bluetooth low energy protocol;

for each connection event, clocks a remaining duration of the current idle time period;

receives requests for real time audio streaming transmissions in bursts, such bursts having a duration shorter than the regular anchor timing and no greater than 10 ms, the bursts collectively providing real time audio streaming of at least 34 kbps, the requests including time slot information;

determines, based on the time slot information, whether each requested burst can be completed during the remaining duration of the current idle time period;

a control data stack for transception of Bluetooth low energy control data in communication with the link layer; and an audio stack for reception of the real time audio streaming in communication with the link layer;

wherein:
if the requested burst cannot be completed during the remaining duration of the current idle time period, the link layer maintains communication between the control data stack and the physical layer of the radio transceiver; and if the requested burst can be completed during the remaining duration of the current idle time period, the link layer provides communication between the audio stack and the physical layer of the radio transceiver.

17. The battery powered mobile hearing device of claim 16 configured to be head-worn, and further comprising:
a microphone;
a digital signal processor receiving audio information from the microphone;
and a receiver for outputting sound pressure waves to an ear canal of a user;
wherein the control data comprises volume and band-specific gain.

18. The battery powered mobile hearing device of claim 17, wherein a ratio of real time audio stream rate to control data transception rate is at least 50 to 1.

19. A system for wireless audio streaming, comprising:
a first device programmed to transceive control data in accordance with Bluetooth low energy protocol and using regular anchor timing;
a second device which transmits real time audio transmissions in bursts, such bursts having a duration shorter than the regular anchor timing and no greater than 10 ms, the bursts collectively providing real time audio streaming of at least 34 kbps; and
a battery powered mobile hearing device having a sound output for real time audio under concurrent control via the control data, the hearing device comprising:
a physical layer of a radio transceiver;
a link layer controlling the physical layer, wherein the link layer:
establishes regular anchor timing for transception of control data through connection events, with idle time periods between connection events, all in accordance with Bluetooth low energy protocol;
for each connection event, clocks a remaining duration of the current idle time period;

receives requests for real time audio streaming transmissions in bursts, the requests including time slot information;

determines, based on the time slot information, whether each requested burst can be completed during the remaining duration of the current idle time period;

a control data stack for transception of Bluetooth low energy control data in communication with the link layer; and an audio stack for reception of the real time audio streaming in communication with the link layer;

wherein:

if the requested burst cannot be completed during the remaining duration of the current idle time period, the link layer maintains communication between the control data stack and the physical layer of the radio transceiver; and if the requested burst can be completed during the remaining duration of the current idle time period, the link layer provides communication between the audio stack and the physical layer of the radio transceiver.

* * * * *